Aug. 1, 1967  L. L. HOWLAND  3,334,273
CONTROL DEVICE FOR POLY-PHASE ELECTRICAL SYSTEM
Filed July 12, 1965  2 Sheets-Sheet 1

INVENTOR.
Leland L. Howland
BY
Whiteley and Caine
ATTORNEYS

INVENTOR.
Leland L. Howland
BY
Whiteley and Caine
ATTORNEYS 3,334,273
CONTROL DEVICE FOR POLY-PHASE
ELECTRICAL SYSTEM
Leland L. Howland, Minneapolis, Minn., assignor to
Thermo King Corporation, Minneapolis, Minn., a corporation of Delaware
Filed July 12, 1965, Ser. No. 471,140
7 Claims. (Cl. 317—48)

This invention relates to improvements in a control device for use in a poly-phase electrical system. In general, the invention is concerned with sensing and correcting improper phase sequence, or in rendering a circuit inoperative where improper voltages occur, or when one of the phase conductors is inoperative, or when the phase sequence is improper.

In a three-phase system, as is commonly utilized in the operation of larger electrical motors, it is important that the proper phase sequence always be maintained. A three-phase motor is designed to receive a certain phase sequence; if this proper or positive phase sequence is in any way reversed to an improper or negative sequence, the direction of rotation of the motor will be reversed, and considerable damage may occur to the mechanisms driven by the motor.

There may be generator problems which will shift the phase sequence, or a mechanic working with electrical lines may change the position of two of the lines at a junction box. An electric motor used in conjunction with some form of portable equipment may receive the correct phase sequence when connected to an outlet in one location, but may receive an improper or reversed phase sequence after moving to another location.

Devices have been employed for indicating a reversed phase sequence, and devices for correcting phase sequence have also been introduced, but prior phase sequence correcting devices have been complex and expensive. A type of phase correcting device commonly employed in a three-phase system consists of a three-phase torque motor having a restrained rotor which actuates a number of contacts which reverse the phase sequence if it is an improper sequence. This device is heavy, prone to sticking, and produces considerable heat. A primary disadvantage of prior phase correcting devices is their complexity and resultant expense in manufacturing and operation.

An object of the invention is to provide, in one relatively inexpensive control device, means for sensing and correcting improper phase sequences, and preventing operation of a power utilization device when voltages are incorrect or where one of the phase conductors is disconnected or inoperative.

Another object of the present invention is to provide a simple, light-weight, inexpensive, and dependable device for sensing and responding to reversed phase sequences.

Another object of this invention is to provide a simple, inexpensive, and dependable device for correcting a reversed phase sequence.

Another object of the invention is to provide a phase sequence correcting device which will also respond to prevent incorrect voltage from being applied to electrical equipment, both when the applied voltage is too high, and when it is too low.

A further object of the present invention is to provide a simple, inexpensive phase sequence correcting device which will prevent single phasing should a leg of the three-phase system become disconnected.

These and other objects and advantages of the present invention will become apparent from the following specification and claims; reference being had to the accompanying drawings, wherein:

Figure 1:
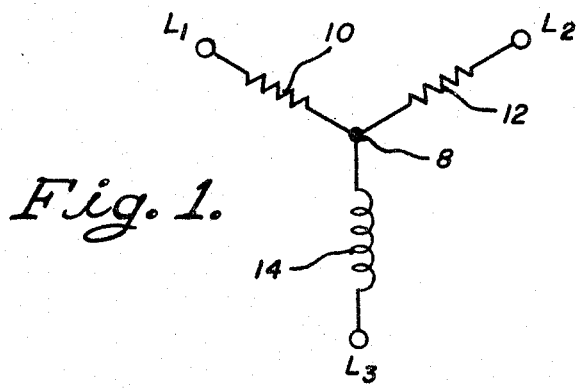
FIG. 1 is a schematic diagram of a phase sensitive three-phase network utilized in the invention.

FIG. 1 represents a common type of phase sensitive network which is employed in a three-phase system. The three branches or legs of the network are designated by reference characters $L_1$, $L_2$ and $L_3$, and the three branches or legs so indicated meet at a common junction 8. The phase sequence sensitive network includes a resistance 10 in leg $L_1$, a resistance 12 in leg $L_2$, and an inductance 14 at leg $L_3$.

The current in leg $L_1$ is in phase with the voltage of leg $L_1$, and the current in leg $L_2$ is in phase with the voltage of leg $L_2$. Because of the inductive reactance of the coil 14 in leg $L_3$, the current in leg $L_3$ lags the voltage of that leg. Assuming that resistances 10 and 12 are of equal value, the inductance 14 will cause an imbalance in the currents in legs $L_1$ and $L_2$. Application of one phase sequence to the three-leg network will cause a greater amount of current in leg $L_1$, while application of the reversed phase sequence will cause a greater amount of current in leg $L_2$. If it is assumed that the application of a positive phase sequence A–B–C to legs $L_1$, $L_2$, $L_3$ produces a greater current in leg $L_1$, then the negative sequence B–A–C will produce a greater current in leg $L_2$.

If a capacitive reactance is substituted for the inductive reactance 14 in leg $L_3$, the current in leg $L_3$ will lead the voltage, and the same basic principles will apply.

Figure 2:
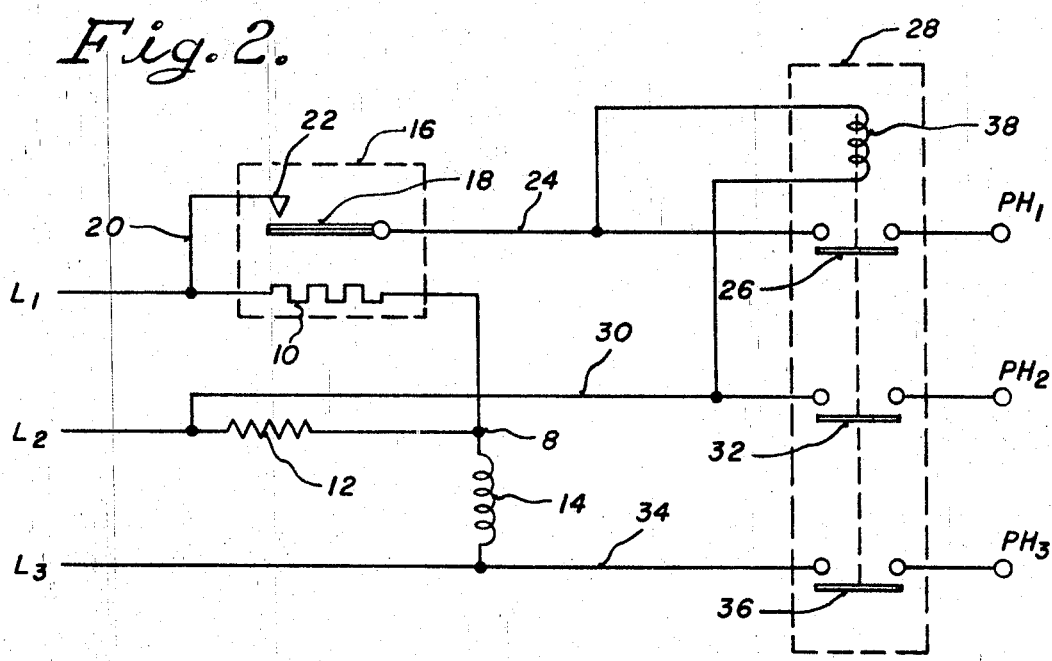
FIG. 2 is a wiring diagram of a phase sensitive device of the invention utilized to energize a contactor or control switch.

Referring now to FIG. 2, these principles are employed in a device which will connect three-phase electrical equipment with the three input lines of such a system only if the positive phase sequence is maintained, and which will disconnect such equipment if the phase sequence is somehow reversed. If a positive phase sequence is applied to leg inputs $L_1$, $L_2$ and $L_3$ in the device illustrated in FIG. 2 in the order A–B–C, the phase sequence sensitive network, consisting of a resistive heating element 10 of a thermal relay 16 in leg $L_1$, a resistor 12 in leg $L_2$, and an inductance 14 in leg $L_3$, meeting in a common junction 8, responds by increasing the current in leg $L_1$ sufficiently to heat the heating element 10 to actuate a thermal responsive bimetallic switch 18 of the thermal relay 16. If the phase sequence is reversed, the current in leg $L_1$ is substantially decreased and the heat produced by the heating element 10 is not sufficient to actuate the bimetallic switch 18 of thermal relay 16.

A conductor 20 connects the input of leg $L_1$ to a contact 22 of the thermal relay 16, and an output conductor 24 connects the bimetallic switch 18 of relay 16 to one side of a switch 26 of a magnetic multiple contactor or relay 28 interposed between the thermal relay 16 and a phase terminal $PH_1$ of a power utilization device, not shown. An output conductor 30 connects the input of leg $L_2$ to one side of a second switch 32 of the multiple contactor 28, the other side of which is connected to a phase terminal $PH_2$ of a power utilization device, not shown. A conductor 34 connects leg $L_3$ of the phase sensitive network to a third switch 36 of the multiple contactor 28, the other side of which is connected to a phase terminal $PH_3$ of a power utilization device, not shown. A relay coil or winding 38 of the multiple contactor 28 is connected between output conductors 24 and 30, and is adapted to actuate switches 26, 32, and 36 of the multiple contactor 28.

When the phase sequence is positive, the thermal relay 16 is actuated by the heat produced in heating element 10 as a result of the increased current in leg $L_1$. When the thermal responsive bimetallic switch 18 of thermal relay 16 is actuated, it engages contact 22 to complete a circuit from the leg $L_1$ input through the conductor 20, the bimetallic switch 18, and output conductor 24 to relay winding 38, and back through conductor 30 to the leg $L_2$ input. The current through this circuit energizes winding 38 of the multiple contactor 28, actuating switches 26, 32, and 36 to connect output conductors 24, 30, and 34 with phase terminals $PH_1$, $PH_2$ and $PH_3$ respectively.

When the phase sequence is reversed, thermal relay 16 breaks the above mentioned circuit in which winding 38 is interposed, and the multiple contactor 28 disconnects all three phase terminals, thereby preventing the operation of electrical equipment at a reversed phase sequence.

Figure 3:
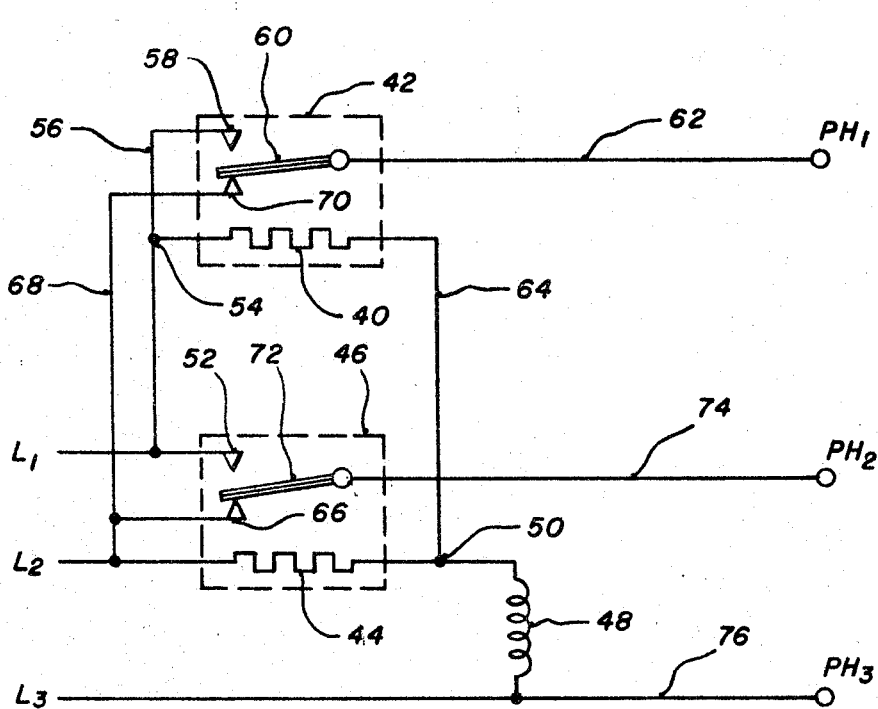
FIG. 3 is a wiring diagram of a phase sequence correcting device embodying the invention.

FIG. 3 represents a device or circuit capable of correcting a reversed phase sequence. A phase sequence sensitive network, as schematically diagrammed in FIG. 1, is employed in the circuit, wherein: the resistance interposed in leg $L_1$ is a heating element 40 of a thermal relay 42, the resistance interposed in leg $L_2$ is a heating element 44 in a second thermal relay 46, an inductance 48 is included in leg $L_3$, and the three legs of the network meet at a common junction 50.

The leg $L_1$ input is connected to a contact 52 of thermal relay 46, and is connected to one end of resistive heating element 40 of thermal relay 42 at a junction 54. A conductor 56 connects the junction 54 with a contact 58 of thermal relay 42. A thermal responsive bimetallic switch 60 of thermal relay 42 is adapted to warp when heated by heating element 40 so as to engage contact 58. An output conductor 62 is connected to bimetallic switch 60. The end of heating element 40, opposite junction 54, is connected to common junction 50 of the three leg network by a conductor 64.

The leg $L_2$ input is connected to one end of the resistive heating element 44 of thermal relay 46 and is also connected to a contact 66 of relay 46, and the other end of heating element 44 is connected to common junction 50. A conductor 68 connects a contact 70 of thermal relay 42 and the contact 66 of thermal relay 46. A thermal responsive bimetallic switch 72 of thermal relay 46, adapted to move between contacts 52 and 66, is connected to an output conductor 74.

An output conductor 76 is connected to the leg $L_3$ input, and connected to output conductor 76 is one side of the inductance 48, the other side of which is connected to common junction 50. Output conductors 62, 74, and 76 are connected to phase terminals $PH_1$, $PH_2$, and $PH_3$, respectively, of a power utilization device not shown.

The operation of the foregoing phase correction device or circuit is as follows: If a correct or positive phase sequence A–B–C is applied to legs $L_1$, $L_2$ and $L_3$, the phase sequence sensitive network, consisting of the resistance of heating element 40 in leg $L_1$, the resistance of heating element 44 in leg $L_2$, and the inductance 48 in leg $L_3$, causes the current in leg $L_1$ to be increased and the current in leg $L_2$ to be decreased, whereby heating element 40 is heated to a degree sufficient to actuate the bimetallic switch 60 of thermal relay 42, which warps to engage contact 58, and the heat produced by heating element 44 is insufficient to actuate bimetallic switch 72 of thermal relay 46, thus allowing it to remain in contact with contact 66. Under such conditions, current will flow from leg $L_1$ input to junction 54, through conductor 56, and bimetallic switch 60 to output conductor 62. Current from leg $L_2$ input will flow to contact 66, through bimetallic switch 72 to output conductor 74, and current from leg $L_3$ input will flow through output conductor 76. Thus, if the positive phase sequence is applied, inputs $L_1$, $L_2$ and $L_3$ are connected to output conductors 62, 74, 76, and phase terminals $PH_1$, $PH_2$ and $PH_3$ respectively to give an output sequence $PH_1$–$PH_2$–$PH_3$.

If a negative phase sequence B–A–C is applied to legs $L_1$, $L_2$ and $L_3$, the phase sensitive network described will increase the current in leg $L_2$ and decrease the current in leg $L_1$, whereby bimetallic switch 72 is actuated to make contact with contact 52 and bimetallic switch 60 remains in contact with contact 70. Under these conditions, current will flow from leg $L_1$ input to contact 52, through bimetallic switch 72 to output conductor 74 and phase terminal $PH_2$. Current will flow from leg $L_2$ input through conductor 68 to contact 70 and through bimetallic switch 60 to output conductor 62 and phase terminal $PH_1$. Leg $L_3$ input will be connected to output conductor 76 and phase terminal $PH_3$. Thus, when a negative phase sequence is applied, inputs $L_1$, $L_2$ and $L_3$ are connected to output conductors 74, 62, 76 and phase terminals $PH_2$, $PH_1$ and $PH_3$ respectively, and the output sequence $PH_1$–$PH_2$–$PH_3$ is maintained.

Figure 4:
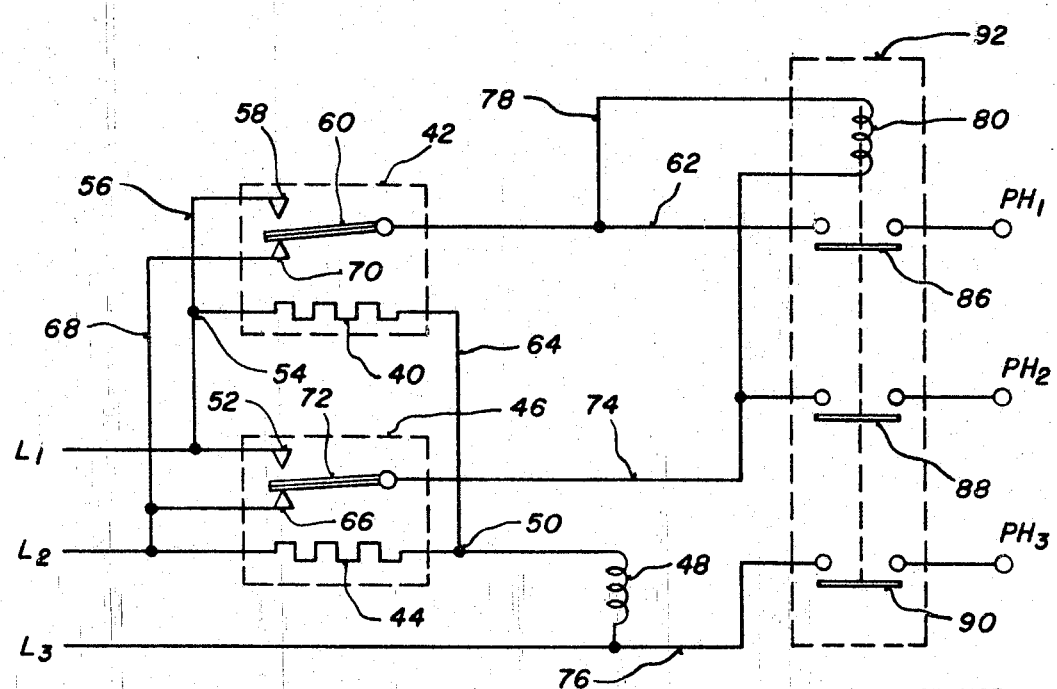
FIG. 4 is a wiring diagram of a modification of the phase sequence correcting device illustrated in FIG. 3.

FIG. 4 represents a modification of the device shown in FIG. 3. To the phase sequence corrective device or circuit, as illustrated in FIG. 3, is added a control circuit 78 connected between output conductors 62 and 74, which includes a relay winding 80 of a magnetic multiple contactor 92. Switches 86, 88 and 90 of multiple contactor 92 are interposed in output conductors 62, 74, and 76 respectively, between the phase sensitive network and phase terminals $PH_1$, $PH_2$ and $PH_3$ of a power utilization device not shown, and are magnetically actuated when relay winding 80 is energized to connect phase terminals $PH_1$, $PH_2$ and $PH_3$ respectively.

The operation of the foregoing modification is as follows: If either the leg $L_1$ input, or the leg $L_2$ input is disconnected, the control circuit 78 is not completed, and all three phase terminals are disconnected by the multiple contactor 92. If leg $L_3$ input is disconnected, the three-leg network is inoperative to increase the current in either leg $L_1$ or leg $L_2$, and both thermal relays remain unactuated. With neither relay actuated, leg $L_2$ is connected to both output conductor 62 and output conductor 74, and with no potential between these conductors, relay winding 80 is not energized and all phase terminals are disconnected.

If the applied voltage is too high, both thermal relays are actuated and leg $L_1$ input is connected to both output conductor 62 and output conductor 74. With no potential between conductors 62 and 74, there is no current in the control circuit 78, and the multiple contactor 92 disconnects all three phase terminals.

If the applied voltage is too low, neither thermal relay is actuated, and leg $L_2$ input is connected to both output conductors 62 and 74, thereby producing no current in the control circuit 78 to energize relay winding 80 of the multiple contactor 92.

The herein described invention embodies a basic principle of the control of electric currents that may be applied in a number of different ways. The principle may be used merely to prevent operation of a motor or other power utilization device if the current is in an improper or reversed phase sequence, or it may be used to prevent operation of the device if the voltage is either deficient or excessive. The principle may also be incorporated into a single device that will automatically correct phase sequence and/or will render the circuits inoperative in the event of excessive or deficient voltages.

It will be obvious to those skilled in the art that the present invention may be modified by many substitutions and equivalents. It should be understood that the invention is not limited to the specific disclosure, but is defined in the terms of the appended claims.

I claim:

1. A phase protective device for use with a three-phase electric circuit embodying three input conductors and three output conductors, comprising a three-leg phase sequence sensitive network disposed between said input and said output conductors, a resistive heating element in one leg of said network, and a thermal responsive switch operably associated with said resistive heating element and disposed between one of said output conductors and at least one of said input conductors.

2. A phase protective device for use with a three-phase electrical circuit embodying three input conductors and three output conductors, comprising a three-leg phase sequence sensitive network disposed between said input and said output conductors, a resistive heating element interposed in one leg of said network and being activated when the leg input voltages are in one predetermined phase sequence, and a thermal responsive switch operably associated with said resistive heating element and disposed between one output conductor and at least one input conductor.

3. A phase protective device for use with a three-phase electrical circuit embodying three input conductors and three output conductors, comprising a three-leg phase sequence sensitive network disposed between said input and said output conductors, a resistive heating element interposed in one leg of said network and being activated when the leg input voltages are in one predetermined phase sequence, a magnetic relay operably connected to a power utilization device, and a thermal responsive switch disposed between said magnetic relay and at least one of said input conductors and which is actuated by said resistive heating element to energize said relay only when the phase sequence is in the proper order.

4. A phase protective device for use with a three-phase electrical circuit embodying three input conductors and three output conductors, comprising a phase sequence sensitive three-leg network disposed between said input and said output conductors, an independent resistive heating element interposed in each of two legs of said network, and two thermal responsive switches each operably associated with one of said resistive heating elements, and each operably connected between an output conductor and at least one input conductor.

5. A phase protective device for use with a three-phase electrical circuit embodying three input conductors and three output conductors, comprising a phase sequence sensitive three-leg network disposed between said input and said output conductors, a first resistive heating element in a first leg of said network, a second resistive heating element in a second leg of said network, a first thermal responsive switch operably associated with said first resistive heating element, and a second thermal responsive switch operably associated with said second resistive heating element, each of said switches operably connected between an output conductor and at least one input conductor, said first switch being actuated when voltages applied to said input conductors are in one of two phase sequences, said second switch being actuated when voltages applied to said input conductors are in the other phase sequence.

6. A protective device for use with a three-phase electrical circuit embodying first, second and third input conductors and first, second and third output conductors, comprising a three-leg phase sequence sensitive network disposed between said input and said output conductors, a first resistive heating element in a first leg of said network, a second resistive heating element in a second leg of said network, a first thermal responsive switch operably associated with said first resistive heating element, and a second thermal responsive switch operably associated with said second resistive heating element, said first switch being actuated when voltages applied to said input conductors are in one of two phase sequences, said second switch being actuated when voltages applied to said input conductors are in the other phase sequence, said first switch operable to connect said first, second and third input conductors with said first, second and third output conductors respectively, and said second switch operable to connect said second, first and third input conductors with said first, second and third output conductors respectively.

7. A phase protective device for use with a three-phase electrical circuit, embodying three input conductors and first, second and third output conductors, comprising a phase sequence sensitive three-leg network disposed between said input and said output conductors, an independent resistive heating element interposed in each of two legs of said network, a relay winding connected between said first and second output conductors, and operable to actuate a contactor in each of said output conductors, and two thermal responsive switches each operably associated with one of said resistive heating element, and one of said switches operably connected between said first output conductor and at least one input conductor and the other of said switches operably connected between said second output conductor and at least one input conductor, the resistive value of said heating elements being such that both of said thermal responsive switches are actuated by an excessive voltage applied to said input conductors, and that neither of said switches are actuated by an insufficient voltage applied to said input conductors, whereby in either case said thermal responsive switches are operable to connect one of said input conductors to both of said first and second output conductors to de-energize said relay winding.

References Cited
UNITED STATES PATENTS

| | | | |
|---|---|---|---|
| 2,312,915 | 3/1943 | Kurtz | 317—40 X |
| 2,724,782 | 11/1955 | Holloway | 317—48 X |
| 3,218,485 | 11/1965 | Takai | 317—48 X |

MILTON O. HIRSHFIELD, *Primary Examiner.*

J. D. TRAMMELL, *Assistant Examiner.*